United States Patent [19]
Burke

[11] 3,848,478
[45] Nov. 19, 1974

[54] SHIFT LEVER BOWL ASSEMBLY

[75] Inventor: Harold J. Burke, Saginaw, Mich.

[73] Assignee: General Motors Corporation, Detroit, Mich.

[22] Filed: Sept. 12, 1973

[21] Appl. No.: 396,352

[52] U.S. Cl............... 74/484, 29/453, 74/473 SW, 403/353
[51] Int. Cl......................... G05g 9/12, B23p 11/02
[58] Field of Search....... 74/484, 485, 486, 473 SW; 29/453; 403/353

[56] References Cited
UNITED STATES PATENTS

| | | | |
|---|---|---|---|
| 1,904,967 | 4/1933 | Barder | 29/453 X |
| 1,974,540 | 9/1934 | Nerley | 403/353 |
| 2,823,556 | 2/1958 | Cislo | 74/484 X |
| 2,938,373 | 5/1960 | Gray et al. | 29/453 X |
| 3,436,982 | 4/1969 | Jirik | 74/484 |
| 3,748,921 | 7/1973 | Farrell et al. | 74/484 |

*Primary Examiner*—Allan D. Herrmann
*Attorney, Agent, or Firm*—John P. Moran

[57] ABSTRACT

A shift lever bowl assembly wherein the shift bowl and bowl cover are formed of pressed steel, the bowl cover having a flared end-portion and the shift bowl having a matching flared sidewall, the bowl cover further including an inwardly and rearwardly extending lip formed on the end of the flared portion such that the shift bowl is "snapped" past the lip into the bowl cover to be retained in place against the inner surface of the flared end-portion by the lip.

8 Claims, 4 Drawing Figures

PATENTED NOV 19 1974
3,848,478
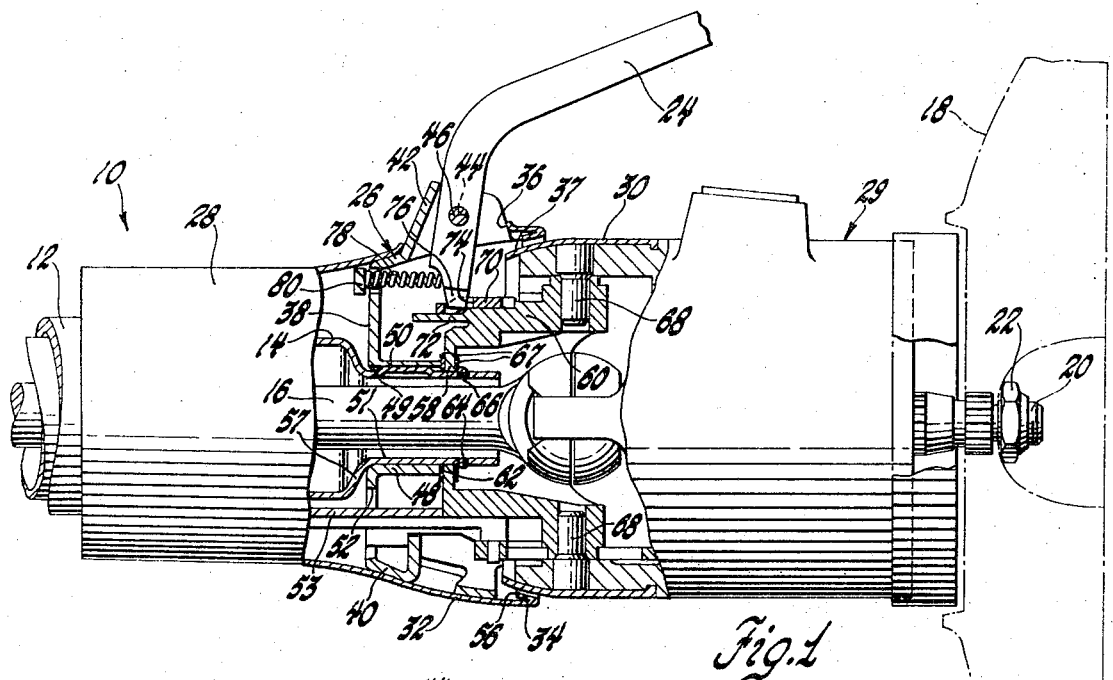
Fig.1
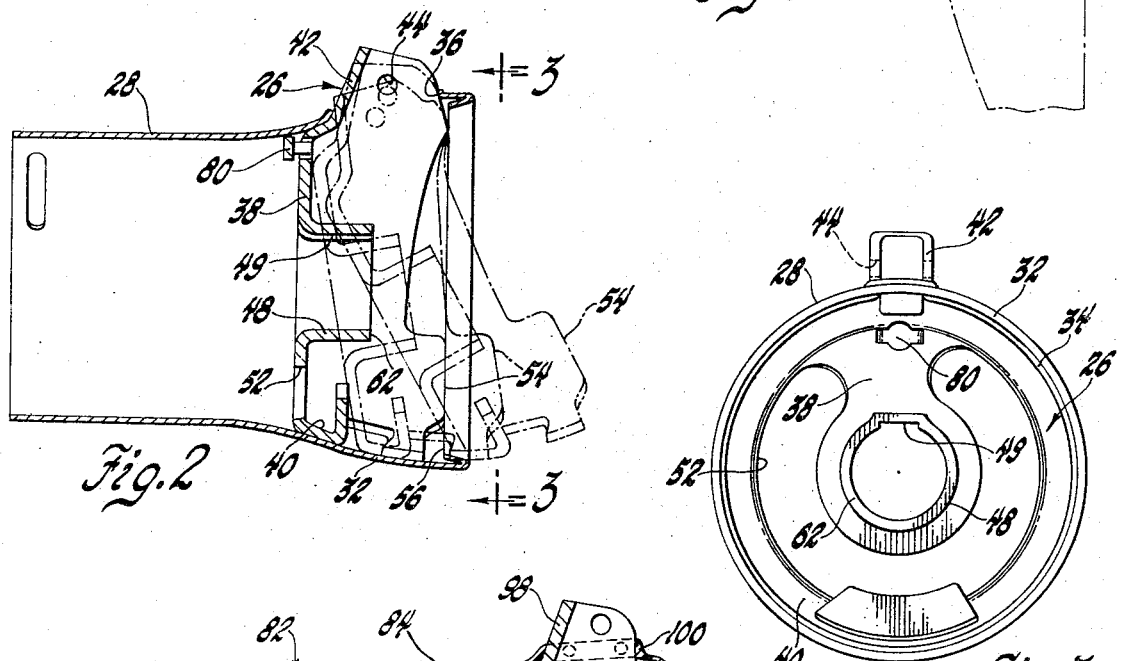
Fig.2
Fig.3
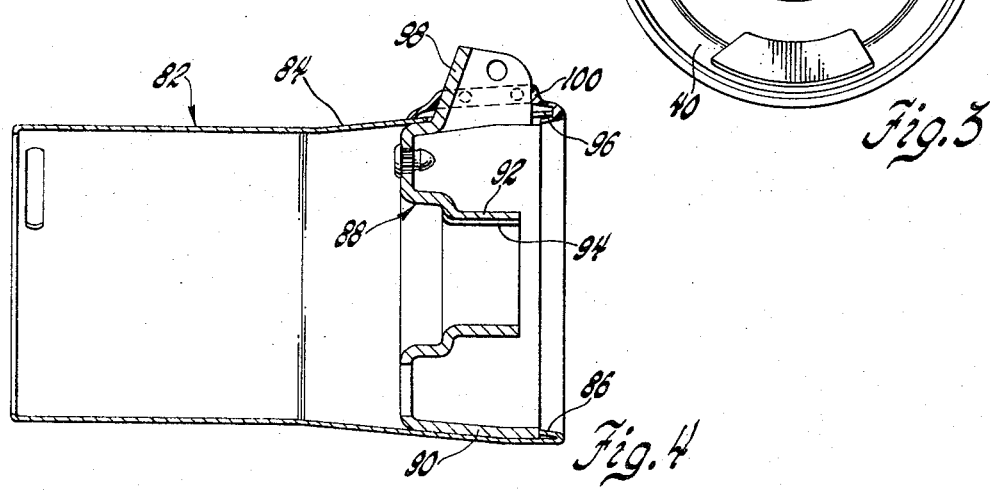
Fig.4

SHIFT LEVER BOWL ASSEMBLY

This invention relates generally to vehicular steering column shift bowl components and, more particularly, to a pressed steel shift bowl assembly.

Due to the relatively close tolerances required, vehicular steering column shift bowl assemblies to date have customarily been formed of zinc die cast components and, hence, have been relatively heavy and expensive. Weight reduction may become important should any increased cantilevered load on the steering column, resulting from the mounting thereon of an air restraint system, become a factor. Hence, pressed steel shift bowl assmeblies are currently under consideration. However, spot-welded or projection-welded designs have proved unsatisfactory due to resultant weld tab variation, misalignment, and heat distortion characteristics which tend to hamper the assembly process.

Accordingly, a general object of the invention is to provide an improved vehicular steering column shift bowl assembly which is light-weight, economical, readily assembled, and performs efficiently under all operating conditions.

Another object of the invention is to provide an improved pressed steel vehicular shift bowl assembly which may be assembled by a simple snap-fit operation.

A further object of the invention is to provide an improved pressed steel shift bowl assembly comprising a cylindrical shift bowl cover having a flared end-portion with an inwardly and rearwardly extending retaining flange or lip formed on the end thereof, and a shift bowl whose sidewall contour conforms to the flared end-portion and which may be snapped into the bowl cover, past the retaining lip, to seat uniformly against the inner surface of the flared end-portion for permanent retention therein by the retaining lip.

Still another object of the invention is to provide such a pressed steel shift bowl assembly wherein, in one embodiment, a selector lever mounting clevis formed on the shift bowl is first inserted in an opening in the bowl cover and the shift bowl is then pivoted into place within the bowl cover, snapping past the retaining lip thereof, and, in a second embodiment, the shift bowl is pressed or snap-fitted "straight-in" past the retaining lip into place within the bowl cover, there being an open-ended slot formed on the flared end-portion to accommodate the entry therein of the selector lever mounting clevis, both embodiments resulting in permanent, mechanical, interference fit assemblies.

These and other objects and advantages of the invention will be apparent when reference is made to the following description and accompanying drawings, wherein:

FIG. 1 is a fragmentary cross-sectional view of a vehicular steering column embodying the invention;

FIG. 2 is a cross-sectional view of a shift bowl and bowl cover embodying the invention;

FIG. 3 is an end view taken along the plane of line 3—3 of FIG. 2, and looking in the direction of the arrows; and FIG. 4 is a cross-sectional view of an alternate embodiment of the invention.

Referring now to the drawings in greater detail, FIG. 1 illustrates a steering column assembly 10 including the usual steering jacket 12, shift tube 14, and steering rod 16. The steering rod 16 is adapted to be rotated by a steering wheel 18 within the shift tube 14, the steering wheel 18 being secured to the upper threaded end 20 of the steering rod 16 by a nut 22. The shift tube 14, in turn, is adapted to be rotated by a selector lever 24 via a shift bowl 26. A shift bowl cover 28 is secured to the shift bowl 26 in a manner to be described, and an upper stationary housing assembly 29 including a housing cover 30 is mounted intermediate the shift bowl cover 28 and the steering wheel 18.

The shift bowl cover 28 is formed of pressed steel and includes an outwardly flared upper end-portion 32 with an inwardly folded and rearwardly extending retaining lip or flange 34 formed on the extreme end thereof. An opening or porthole 36 is formed in the flared upper end-portion 32 adjacent the flange 34. A necked-down portion 37 of the housing cover 30 extends within and past the flange 34.

The shift bowl 26 is formed of pressed steel to include an end wall 38 and a flared sidewall 40, the outer surface of which conforms to the inner surface of the flared end-portion 32. A shift lever clevis 42 is formed on a side of the shift bowl 26. An opening 44 is formed in the clevis 42 suitable for the insertion therein of a pin 46 for mounting the selector lever 24 through the clevis 42. A central cylindrical wall 48 having a length shorter than the overall length of the flared sidewall 40 is formed in the end wall 38 suitable for the mounting therethrough of the shift tube 14. A longitudinal slot or keyway 49 (FIG. 3) is formed in the cylindrical wall 48, and an arcuate opening 52 is formed in the end wall 38. The keyway 49 accommodates the mounting therein of a key 50 (FIG. 1) formed on a reduced upper end-portion 51 of the shift tube 14, and the arcuate opening 52 accommodates the extension therethrough of the upper end-portion 53 of the steering jacket 12.

As may be noted in FIG. 2, the method of assembling the shift bowl 26 and the shift bowl cover 28 is as follows:

the selector lever clevis 42 is first inserted or "hooked" in the opening or porthole 36 from the inside; the bowl 26 is then pivoted about the clevis 42 into the shift bowl cover 28, past the retaining lip or flange 34, until the upper edge, consisting of three raised portions 54 (FIG. 2), of the bowl 26 snaps past the inner edge 56 of the retaining lip 34, wedging the outer surface of the flared sidewall 40 of the shift bowl 26 into full abutting contact with the inner surface of the flared end-portion 32 of the shift bowl cover 28.

Once the above-described shift bowl assembly is completed, such assembly is adapted to being mounted onto the reduced end portion 51 of the shift tube 14 at the cylindrical wall 48, the latter abutting against a shoulder 57 formed on the shift tube 14. The key 50 in the keyway 49 serves to cause the shift tube 14 to rotate with the shift bowl 26. A flange 58 (FIG. 1), formed on a support member 60, is mounted around the upper end of the shift tube 14 and against the edge 62 of the cylindrical wall 48, being retained thereagainst by a retainer ring 64 mounted in oppositely disposed engagement slots 66 formed on the shift tube 14. A pair of thrust washers 67 may be mounted adjacent the faces of the flange 58. The support member 60 may be connected to the upper housing assembly 29 by pivot pins 68 where it is desired to have a pivotable steering wheel 18 mounted thereon.

A conventional arcuate-shaped shift lever gate 70 (FIG. 1) is secured to an arcuate wall portion 72 of the support member 60, with suitable shift ratio slots 74 formed therein for cooperation with the inner end 76 of the shift lever 24. A spring 78, mounted between the shift lever 24 and a spring retainer 80 formed on the shift bowl 26, biases the end 76 into the selected shift ratio slot 74.

Referring now to the alternate embodiment of FIG. 4, it may be noted that the shift bowl cover 82 thereof is flared at the upper end-portion 84 thereof to include a narrow opening or mouth, as compared to that of the shift bowl cover 28, adjacent a retaining lip 86 formed on the end thereof similar to the lip 34. Likewise, the shift bowl 88 is formed to include a side wall 90 which conforms to the flared end-portion 84 of the shift bowl cover 82, and an inner cylindrical mounting wall 92 with keyway 94, comparable to the wall 48 and keyway 49, respectively of the FIG. 2 embodiment. Additionally, an open-ended slot 96 is formed in the end-portion 84 and through the retaining lip 86 to accommodate a "straight-in" press-fit assembly of the bowl 88 into the end-portion 84 of the bowl cover 82, the selector lever clevis 98 entering through the slot 96. Once thus assembled within the retaining lip 86, a trim element 100 is mounted around the clevis 98 to cover the slot 96.

It should be apparent that the invention provides an improved light-weight, economical and readily assembled shift bowl assembly which results in a permanent, mechanical, interference fit assembly arrangement.

It should be apparent that, inasmuch as the shift bowl is the "working" member, and the shift bowl cover is merely cosmetic in function, the latter cover could be formed of a suitable plastic material in order to accomplish further weight reduction, if desired.

While but two embodiments of the invention have been shown and described, other modifications thereof are possible.

I claim:

1. A steering column shift bowl assembly comprising a cylindrical shift bowl cover having a flared end-portion formed thereon, an inwardly and rearwardly extending flange formed on the end of said flared end-portion, an opening formed in said flared end-portion, and a shift bowl having a side wall whose outer surface conforms to the inner surface of said flared end-portion, a selector lever mounting clevis formed on said shift bowl wall and extending through said opening, said shift bowl being retained against said flared end-portion in a permanent, mechanical interference fit therewith by said inwardly and rearwardly extending flange.

2. A steering column shift bowl assembly comprising a pressed steel, cylindrical shift bowl cover having a flared end-portion formed thereon, an inwardly and rearwardly extending flange formed on the end of said flared end-portion, an opening formed in said flared end-portion, and a pressed steel shift bowl having a side wall formed such that the outer surface thereof conforms to the inner surface of said flared end-portion, a selector lever mounting clevis formed on said shift bowl wall and extending through said opening, said shift bowl being retained against said flared end-portion in a permanent, mechanical interference fit therewith by said inwardly and rearwardly extending flange.

3. A steering column shift bowl assembly comprising a pressed steel, cylindrical shift bowl cover having a flared end-portion formed thereon, an inwardly and rearwardly extending flange formed on the end of said flared end-portion, an opening formed in said flared end-portion, and a pressed steel shift bowl having the sidewall thereof formed such that the outer surface thereof conforms to the inner surface of said flared end-portion, a selector lever mounting clevis formed on said shift bowl wall, said clevis extending through said opening and said shift bowl being snap-fitted past said flange, into said flared end-portion to assume a permanent, mechanical interference fit therewith.

4. A steering column shift bowl assembly comprising a pressed steel, cylindrical shift bowl cover having a flared end-portion formed thereon, an inwardly and rearwardly extending flange formed on the end of said flared end-portion, an opening formed in said flared end-portion adjacent said flange, and a pressed steel shift bowl having a sidewall formed such that the outer surface thereof conforms to the inner surface of said flared end-portion, a selector lever mounting clevis formed on said shift bowl wall and extending through said opening, said shift bowl being retained against said flared end-portion in a permanent, mechanical interference fit therewith by said inwardly and rearwardly extending flange.

5. A steering column shift bowl assembly comprising a pressed steel, cylindrical shift bowl cover having a flared end-portion formed thereon, an inwardly and rearwardly extending flange formed on the end of said flared end-portion, an open-ended slot formed in said flared end-portion and said flange, and a pressed steel shift bowl having a sidewall formed such that the outer surface thereof conforms to the inner surface of said flared end-portion, a selector lever mounting clevis formed on said shift bowl wall and extending through said open-ended slot, said shift bowl being retained against said flared end-portion in a permanent, mechanical interference fit therewith by said inwardly and rearwardly extending flange.

6. The method of assembling a shift bowl and a shift bowl cover comprising the following steps:

a. forming a shift bowl cover to include a flared end-portion, an inwardly and rearwardly extending flange formed on the end of said flared end-portion, and an opening formed in said flared end-portion;

b. forming a shift bowl having a sidewall shaped to match said flared end-portion and including a selector lever mounting clevis formed on said sidewall; and c. inserting said clevis in said opening and pressing said shift bowl past said inwardly and rearwardly extending flange, into said shift bowl cover, until said sidewall snaps past said flange and seats against the inner surface of said flared end-portion, to be retained thereagainst by virtue of the edge of said flange abutting against an edge of said shift bowl.

7. The method of assembling a shift bowl and a shift bowl cover comprising the following steps:

a. forming a shift bowl cover to include a flared end-portion, an inwardly and rearwardly extending flange formed on the end of said flared end-portion, and an opening formed in said flared end-portion adjacent said flange;

b. forming a shift bowl having a sidewall shaped to match said flared end-portion and including a selector lever mounting clevis formed on said sidewall; and c. inserting said clevis in said opening and pivoting said shift bowl past said inwardly and rearwardly extending flange, into said shift bowl cover, until said sidewall snaps past said flange and seats against the inner surface of said flared end-portion, to be retained thereagainst by virtue of the edge of said flange abutting against an edge of said shift bowl.

8. The method of assembling a shift bowl and a shift bowl cover comprising the following steps:
   a. forming a shift bowl cover to include a flared end-portion, an inwardly and rearwardly extending flange formed on the end of said flared end-portion, and an open-ended slot formed in said flared end-portion and said flange;
   b. forming a shift bowl having a sidewall shaped to match said flared end-portion and including a selector lever mounting clevis formed on said sidewall; and
   c. inserting said clevis into said open-ended slot while pressing said shift bowl straight in, passing through said inwardly and rearwardly extending flange, into said shift bowl cover, until said sidewall snaps past said flange and seats against the inner surface of said flared end-portion, to be retained thereagainst by virtue of the edge of said flange abutting against an edge of said shift bowl.

* * * * *